(12) United States Patent
Leonhardt (10) Patent No.: US 7,147,017 B2
(45) Date of Patent: Dec. 12, 2006

(54) FILL LIMIT VENT VALVE ASSEMBLY

(75) Inventor: Ralf Leonhardt, Mauldin, SC (US)

(73) Assignee: Alfmeier Corporation, Greenville, SC (US)

( * ) Notice: Subject to any disclaimer, the term of this patent is extended or adjusted under 35 U.S.C. 154(b) by 299 days.

(21) Appl. No.: 10/878,917

(22) Filed: Jun. 28, 2004

(65) Prior Publication Data

US 2005/0284539 A1   Dec. 29, 2005

(51) Int. Cl.
    F16K 17/04   (2006.01)
(52) U.S. Cl. .................. 141/198; 141/44; 141/46; 141/59; 141/303; 137/43; 137/202
(58) Field of Classification Search ............ 141/5, 141/7, 44–46, 52, 59, 198, 285, 286, 303; 137/43, 202, 587
    See application file for complete search history.

(56) References Cited

U.S. PATENT DOCUMENTS

| | | | |
|---|---|---|---|
| 4,953,583 A | 9/1990 | Szlaga |
| 4,982,757 A | 1/1991 | Ohasi et al. |
| 5,449,029 A | 9/1995 | Harris |
| 5,518,018 A | 5/1996 | Roetker |
| 5,535,772 A | 7/1996 | Roetker et al. |
| 5,566,705 A | 10/1996 | Harris |
| 5,579,802 A | 12/1996 | Tuckey |
| 5,623,910 A | 4/1997 | Riggle |
| 5,640,989 A | 6/1997 | Nemoto et al. |
| 5,678,590 A | 10/1997 | Kasugai et al. |
| 5,687,778 A | 11/1997 | Harris |
| 5,694,968 A | 12/1997 | Devall et al. |
| 5,738,132 A | 4/1998 | Zakai et al. |
| 5,762,090 A | 6/1998 | Halamish et al. |
| 6,016,827 A | 1/2000 | Dawson |
| 6,035,884 A | 3/2000 | King et al. |
| 6,145,532 A | 11/2000 | Tuckey et al. |
| 6,170,510 B1 | 1/2001 | King et al. |
| 6,206,057 B1 | 3/2001 | Benjey et al. |
| 6,240,950 B1 | 6/2001 | Harris |
| 6,286,539 B1 | 9/2001 | Nishi et al. |
| 6,371,152 B1 | 4/2002 | Benjey |
| 6,508,263 B1 | 1/2003 | Jahnke et al. |

(Continued)

FOREIGN PATENT DOCUMENTS

EP   1255941   11/2002

*Primary Examiner*—Timothy L. Maust
(74) *Attorney, Agent, or Firm*—Dority & Manning, PA (57) ABSTRACT

A fill limit vent valve assembly includes a cover assembly, a valve assembly and a fill control system. The fill control system has a primary fuel control window, a secondary fuel control window, a first conduit and a second conduit, the primary and secondary fuel control windows in respective communication with the first and second conduits, the first conduit extending a first distance along the housing and terminating in a first vent aperture, the second conduit extending a second distance along the housing and terminating in a second vent aperture spaced apart from the first vent aperture, the primary fuel control window and the first vent aperture configured to facilitate fuel filling shut-off in a first fuel condition, the secondary fuel control window configured to shut-off fuel filling in a second fuel condition, the second vent aperture configured to provide a fixed amount of fuel vapor venting from the float chamber between the first and second fuel conditions to control entry of a set quantity of a liquid fuel into the fuel tank after the first fuel condition and before the second fuel condition.

68 Claims, 8 Drawing Sheets

U.S. PATENT DOCUMENTS

| | | |
|---|---|---|
| 6,561,211 B1 | 5/2003 | Devall |
| 6,564,822 B1 | 5/2003 | Muto et al. |
| 6,578,597 B1 | 6/2003 | Groom et al. |
| 6,591,855 B1 | 7/2003 | Nishi et al. |
| 6,612,324 B1 | 9/2003 | Szlaga |
| 6,634,341 B1 | 10/2003 | Crary et al. |
| 6,655,403 B1 | 12/2003 | Mills |
| 6,701,950 B1 | 3/2004 | Brock et al. |
| 6,701,952 B1 * | 3/2004 | Ehrman et al. .............. 137/202 |
| 2003/0066558 A1 | 4/2003 | Muto et al. |
| 2003/0189110 A1 | 10/2003 | Kurihara et al. |
| 2004/0089340 A1 | 5/2004 | Muto et al. |

* cited by examiner

FILL LIMIT VENT VALVE ASSEMBLY

FIELD OF THE INVENTION

This invention relates to a fill limit vent valve assembly to prevent overfilling a fuel tank. More specifically, the fill limit vent valve assembly exhibits reduced internal turbulence during fuel filling and in a static condition to prevent fuel carryover.

BACKGROUND OF THE INVENTION

Modern vehicles require fuel management systems that control fuel vapor venting from a vehicle fuel tank to limit fuel filling and that control fuel tank ventilation to prevent overpressure and vacuum conditions in the fuel tank. Fuel filling must be limited to prevent overfilling the fuel tank in order to retain sufficient vapor space above the fuel in the fuel tank to allow vapors to vent to a fuel vapor recovery device during thermal expansion, on-grade parking, and similar conditions.

When refueling a vehicle, a typical pump operator will add a small amount of fuel after an initial fill nozzle shut-off. The operator usually adds this small amount of fuel to "round up" payment to some convenient amount to minimize the amount of change involved in a fuel purchase. Additionally, the operator will often attempt to maximize the amount of fuel pumped into the fuel tank, ostensibly to extend a period of time between fill-ups. To maximize the fuel amount, the operator will dispense the fuel slowly over an extended period of time. Those in the fuel system industry generally describe this as "trickle-fill".

A control valve made by Alfmeier Corporation, Greenville, S.C., is one part of a comprehensive Onboard Refueling Vapor Recovery (ORVR) vehicle fuel system that allows the pump operator some freedom to "round-up" the fuel tank without overfilling. This control valve is the subject of U.S. patent application Ser. No. 10/727,716, filed Dec. 4, 2003, and serves to vent fuel vapor from the vapor space in a fuel tank during early stages of refueling. The control valve also blocks introduction of fuel in excess of a nominal tank volume to preserve a volume of vapor space in the fuel tank once the fuel tank is filled to its rated capacity.

One drawback with the conventional control valve is that during initial filling and any subsequent trickle filling, liquid fuel forcefully enters the control valve causing splash and carry-over of liquid fuel to the fuel vapor recovery device before the control valve can operate to shut-off fuel filling.

Another drawback of the conventional control valve is a "washing machine" effect that often occurs during a hot, static condition. This condition is schematically illustrated by FIGS. 8a and 8b, which show a typical valve V attached to a fuel tank of a vehicle.

Figure 8A:
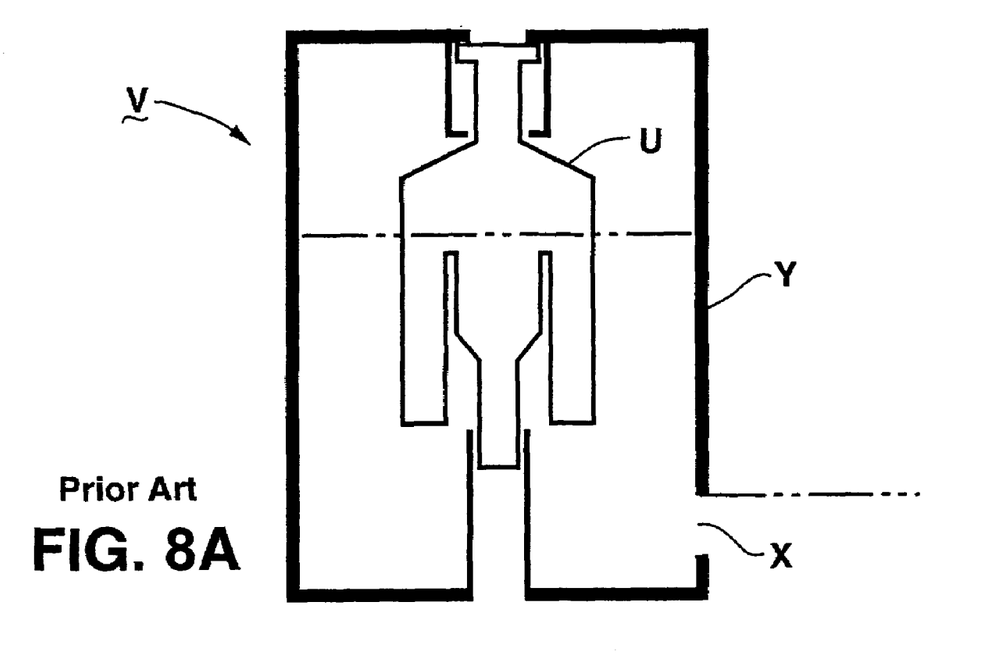
FIG. 8a is a schematic view of a conventional control valve, particular showing its fuel entry window covered by liquid fuel in a full fuel tank.
Figure 8B:
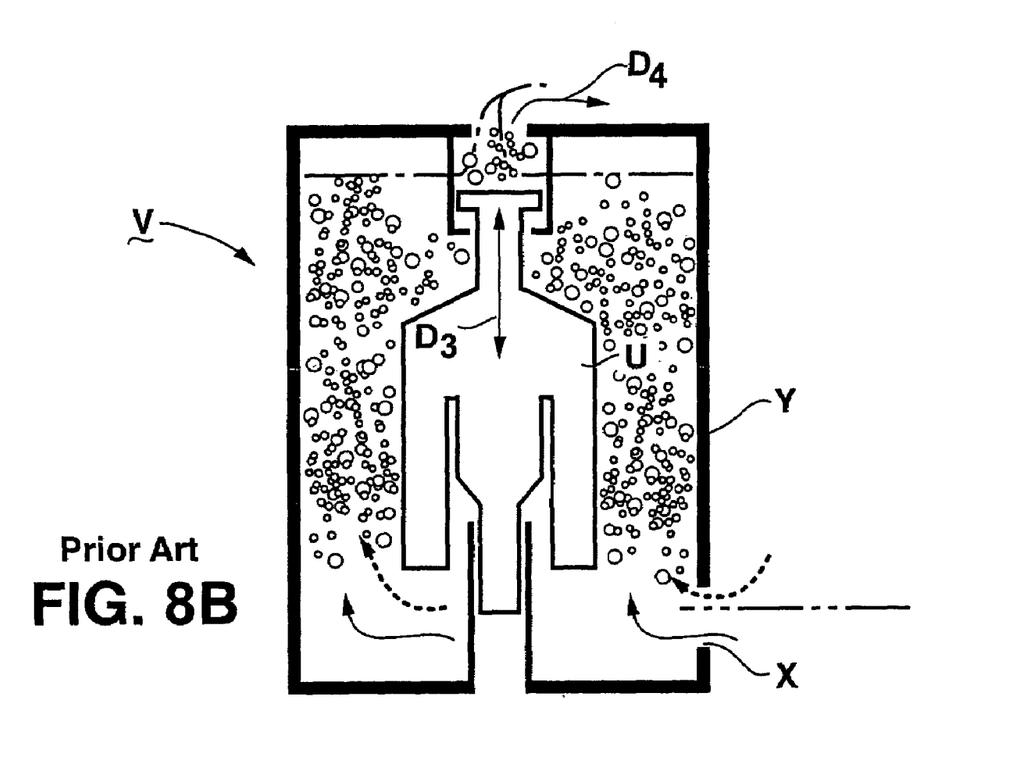
FIG. 8b is similar to FIG. 8a, particularly showing turbulence in liquid fuel in the control valve caused by air entering a portion of the fuel entry window that has opened due to fuel tank expansion.

FIG. 8a shows a fuel entry window X defined in a housing Y of the valve V through which liquid fuel enters when the fuel tank is full. FIG. 8b shows the "washing machine" effect occurring when the vehicle is stationary in a hot environment. As the fuel tank expands due to heat, the fuel level drops sufficiently to open a portion of the fuel entry window X. Due to the increased temperature in the tank, pressurized air is forced through this portion of the fuel entry window X and churns the fuel in the housing Y. Turbulence is created in the fuel, which results in air bubbles in the fuel causing the effective density of the fuel to be reduced. The float U, having preset buoyancy, cannot maintain a seal in the less dense, bubble-infused fuel to seal the valve V. This dynamic phenomenon is indicated by a double-arrow $D_3$, which shows the float U "bobbing" up and down, intermittently sealing the valve V, increasing pressure in the tank, intermittently unsealing the valve V, and permitting additional pressurized air into the fuel entry window X. As the liquid fuel is churned up by the turbulence, some liquid fuel undesirably escapes to the fuel vapor recovery device or to atmosphere as indicated by arrow $D_4$.

SUMMARY

The present invention provides a fill limit vent valve (FLVV) assembly for a fuel tank that prevents overfilling the fuel tank. The FLVV assembly controls direction, rate and quantity of liquid fuel entering an interior of the FLVV assembly. Controlled fuel entry reduces internal turbulence in the FLVV assembly to prevent liquid fuel carryover to a vapor recovery device or the like when the FLVV assembly is not sealed. The FLVV assembly also prevents liquid fuel carryover that would otherwise occur under hot, static conditions.

The component parts of the FLVV assembly are simple and economical to manufacture, assemble, and use. Other advantages of the invention will be apparent from the following description and the attached drawings, or can be learned through practice of the invention.

According to an aspect of the invention, a FLVV assembly is provided for attachment in an aperture of a fuel tank wall. The FLVV assembly includes a cap member or cover assembly with a nozzle, a valve assembly with a valve housing and a sealing mechanism, and a fill control system.

The fill control system, for example, defines a primary fuel control (main vent) window and a secondary fuel control window (fill slot), which are in respective communication with first and second conduits. The first conduit extends a first distance along the housing and terminates in a first vent aperture. The second conduit extends a second distance along the housing and terminates in a second vent aperture spaced apart from the first vent aperture. The second distance, for example, is greater than the first distance in this aspect of the invention to prevent liquid fuel from inadvertently entering the second vent aperture and affecting differential pressure equalization between the FLVV assembly and the fuel tank.

The FLVV assembly generally operates under four conditions. In a pre-fueling condition, the FLVV assembly permits substantially unrestricted fuel vapor venting from the fuel tank through the valve housing and the nozzle into a fuel vapor recovery device.

During fuel filling, the FLVV assembly transitions to the first fuel condition marked by an initial sealing action of the sealing mechanism. At a normal rate of fueling, liquid fuel enters the valve housing via the main vent windows and buoys the sealing mechanism in a direction of the cover assembly. The sealing mechanism seals the valve assembly and prevents fuel vapor discharge, which causes a pressure increase in the fuel tank. The increased pressure causes liquid fuel to back-up in a fill nozzle, which triggers fuel fueling shut-off.

In an interim fuel condition, fuel vapor discharges from the valve housing via the secondary fill slot to permit the sealing mechanism to recede, which allows at least one "trickle fill" to round-up the fuel level in the tank.

In a second fuel condition, the fuel level has risen via trickle filling to obstruct the secondary fill slot, which prevents vapor venting from the FLVV assembly. Since the pressure cannot be quickly equalized between the FLVV assembly and the fuel tank, further trickle filling is prevented and final fuel filling shut-off occurs. Due to the arrangement of the fill control system and its components as described above, the FLVV assembly exhibits reduced interim turbulence during fuel filling and during hot static conditions, which prevents unwanted fuel carryover from the FLVV assembly to the vapor recovery device.

BRIEF DESCRIPTION OF THE DRAWINGS

Further aspects and advantages of the invention will be apparent from the following description, or can be learned through practice of the invention, in combination with the drawings in which.

DETAILED DESCRIPTION OF THE DRAWINGS

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

A fill limit vent valve (FLVV) assembly is broadly embodied in FIGS. 1–7b, generally designated by the number 10. The FLVV assembly 10 prevents an operator from overfilling a fuel tank T and controls turbulence to prevent liquid fuel carryover under static and dynamic conditions.

As FIGS. 1–7b generally show, the FLVV assembly 10 includes a cover assembly 12, a connector 14, a valve assembly 16 including a valve housing 38, and a fill control system 56. These components are assembled by connecting the connector 14 and the valve assembly 16 together with one or both of the connector 14 and the valve assembly 16 connected to the cover assembly 12. When mounted, at least a portion of the valve assembly 16 is disposed in an interior I of the fuel tank T. For example, the assembled FLVV assembly 10 can be flange-mounted through an aperture A in a wall W of a fuel tank T by ultrasonically welding a weldfoot 24a of a mounting portion 24 to the wall W. Those skilled in the art will appreciate that the FLVV assembly 10 can be mounted using other suitable mounting arrangements such as rivets, heat-stakes, snaps, screws and their combinations.

Figure 1:
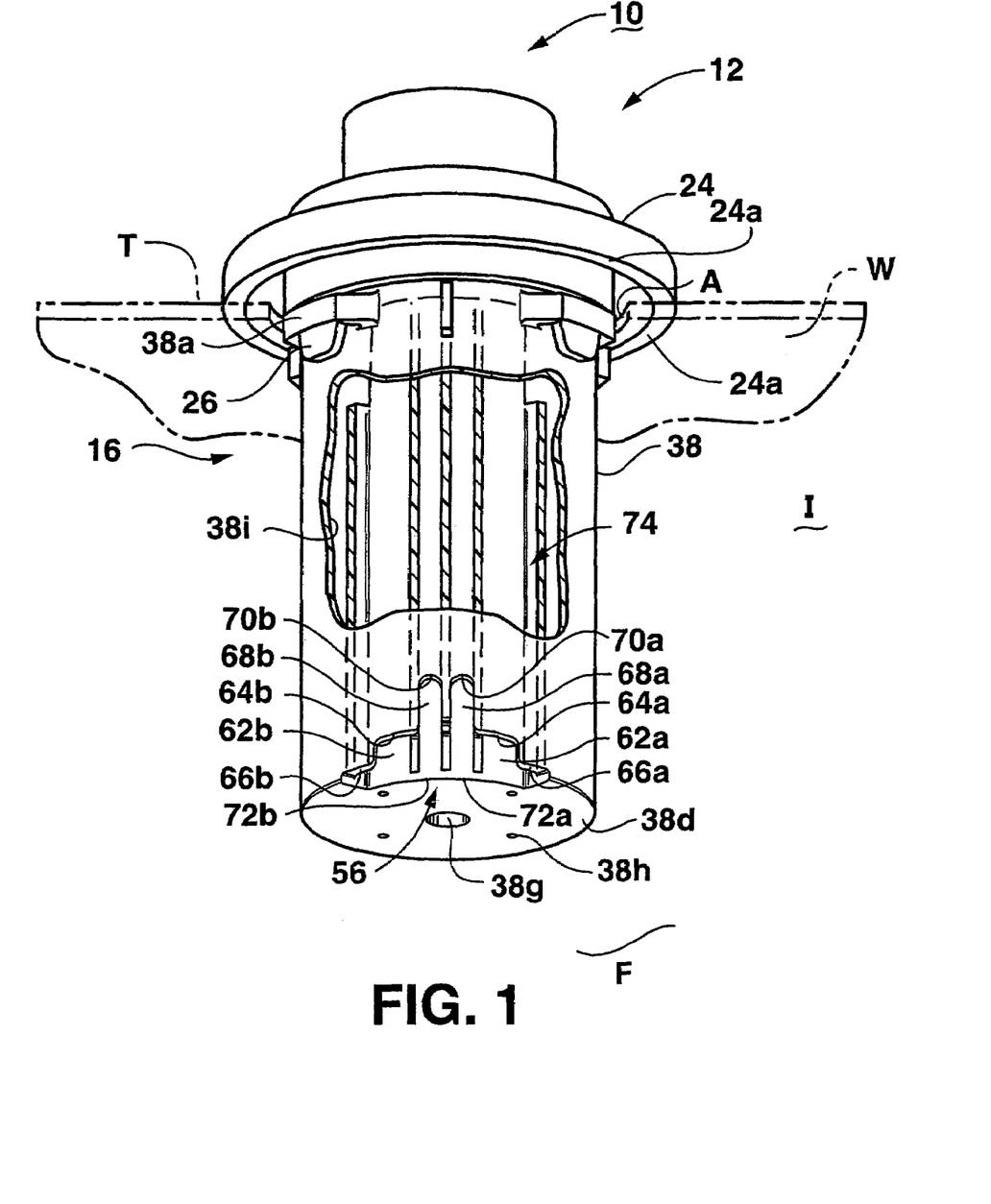
FIG. 1 is a perspective view of a fill limit vent valve for a vehicle fuel tank showing a portion of a fill control system according to an aspect of the invention.

With particular reference to FIG. 1, the exemplary FLVV assembly 10 is shown with the cover assembly 12 attached to the valve housing 38. The cover assembly 12 is made of high-density polyethelene (HDPE), nylon, polyoxymethylene; i.e., acetal plastic (POM), polyetheretherketone (PEEK), or any material suitable for attachment to the wall W of the fuel tank T. The valve housing 38 is made of POM, nylon, PEEK, or other materials suitable for substantially constant contact with a liquid fuel F and fuel vapor in the interior I of the fuel tank T.

Figure 2:
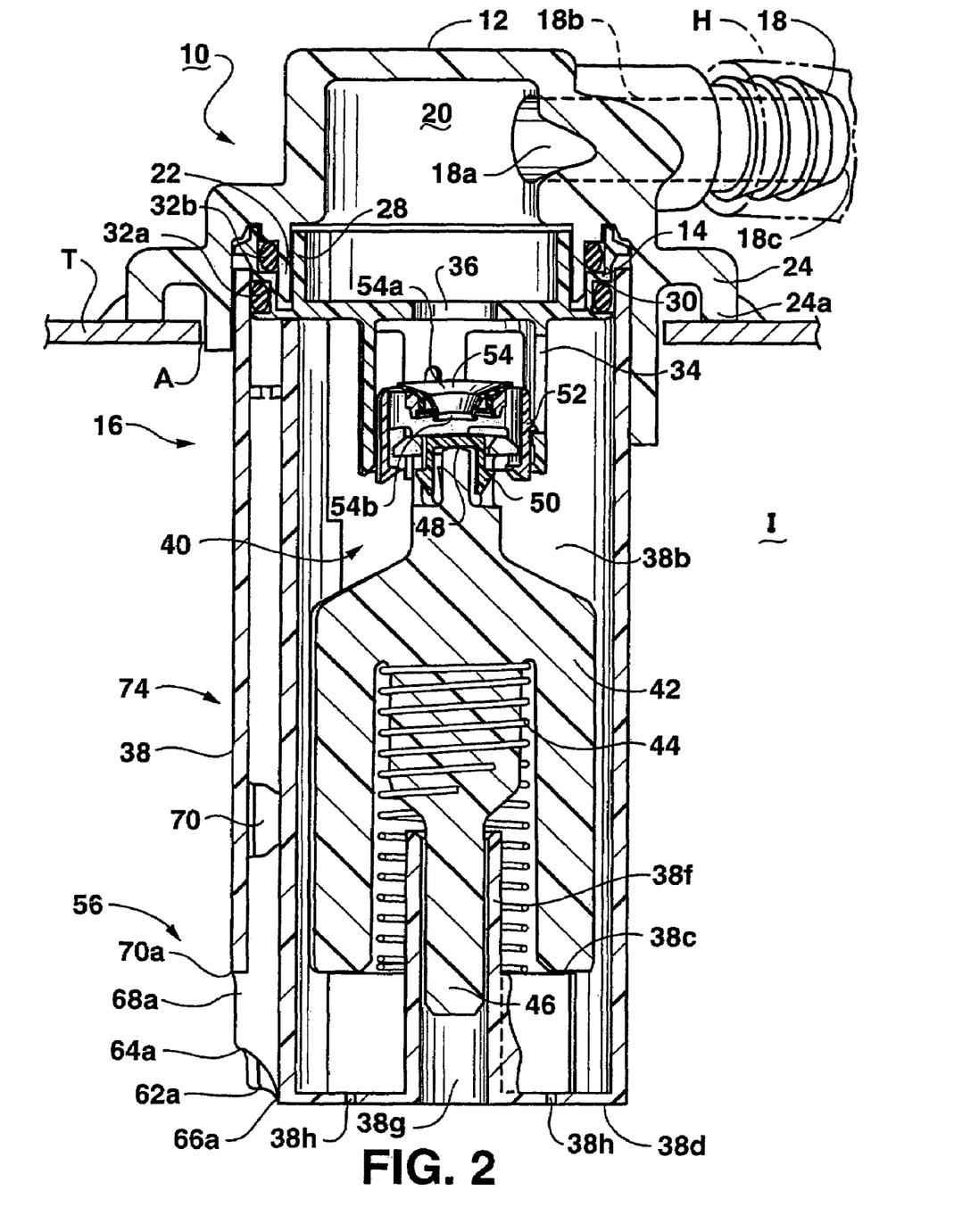
FIG. 2 is an elevational view of a cross-section of the fill limit vent valve as in FIG. 1.
Figure 3:
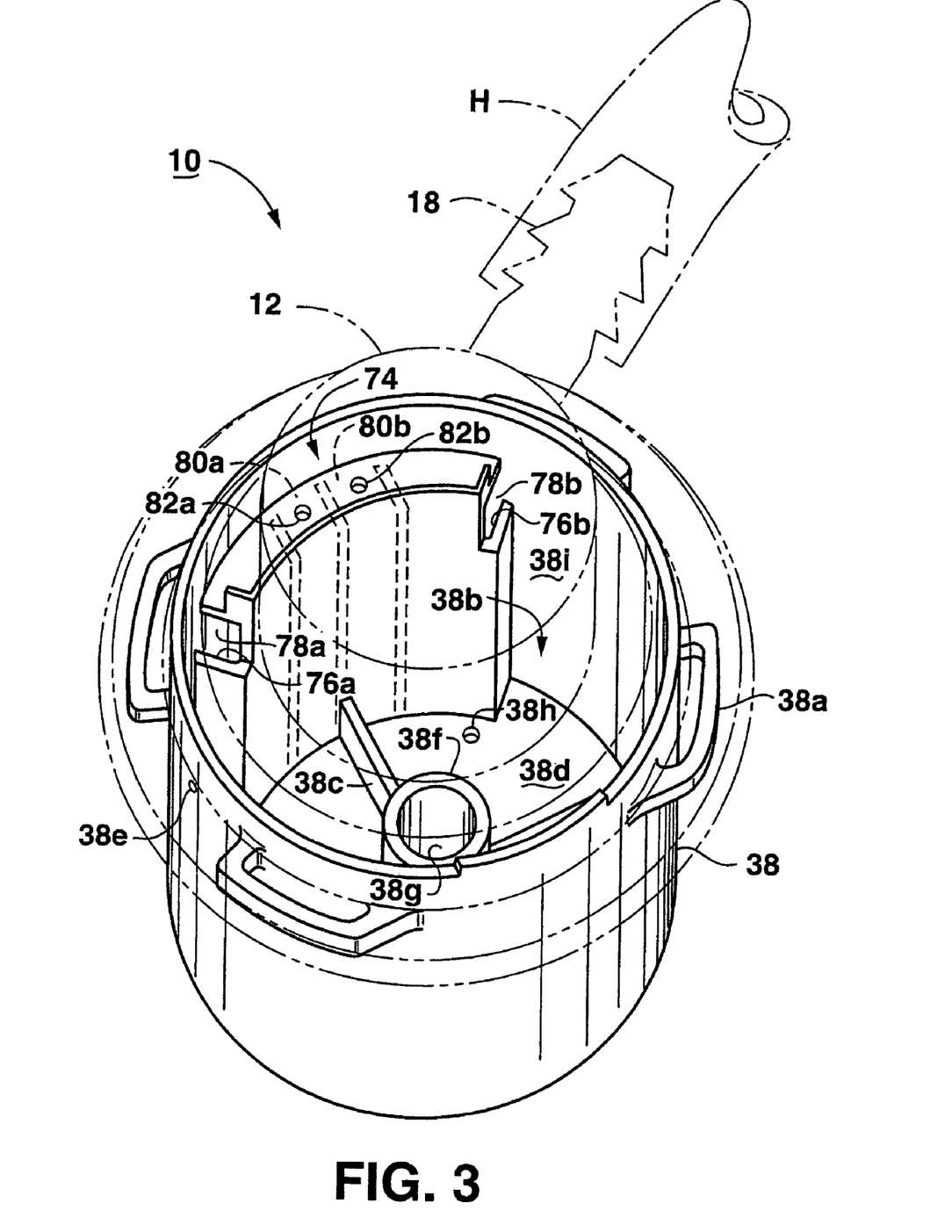
FIG. 3 is a perspective view of a valve housing interior of the fill limit vent valve as in FIG. 1.

With brief reference to FIGS. 1–3, the valve housing 38 defines one or more receptacles or belts 38a, a float chamber 38b, a float stop (rib) 38c, a base 38d, a pin hole 38e, a float guide receptacle 38f, a float guide aperture 38g, one or more drainage holes 38h, and an inner wall 38i. Those skilled in the art of valve assemblies will appreciate that these elements can be arranged or formed to accommodate various fuel tank sizes and manufacturing requirements and are not limited to the examples shown and described in detail below.

Continuing with reference to FIG. 1, one or more clips 26 of the cover assembly 12 are snap-connected to respective belts 38a of the valve housing 38. The clips 26 are made to flex relative to the valve housing 38 during connection of the cover assembly 12 with the valve housing 38. Once the clips 26 are snapped in the belts 38a, the clips 26 return to their original form to hold the cover assembly 12 and the valve housing 38 together. The clips 26 and belt 38a can be reversed, alternated, or generally repositioned on the cover assembly 12 and the valve housing 38. Similarly, a size or shape of the clips 26 and the belts 38a can be modified to accommodate various manufacturing requirements.

The valve housing 38 is shown partially cut-away for clarity in FIG. 1. In this example, the fill control system 56 is formed semi-annular with the valve housing 38. The fill control system 56 includes primary fuel control (main vent) windows 62a and 62b and secondary fuel control (fill) slots 68a and 68b. The main vent windows 62a and 62b respectively define upper edges 64a and 64b and lower edges 66a and 66b. The fill slots 68a,b respectively define top edges 70a and 70b and bottom edges 72a and 72b. The fill control system 56 also includes a fuel/fuel vapor conduit system (labyrinth) 74 partially shown above the main vent windows 62a,b and the slots 68a,b. Described in further detail and by way of example operation below, these and other aspects of the fill control system 56 control initial, interim ("trickle-fill"), and final fuel filling shut-off conditions. Additionally, the fill control system 56 will be further described below with respect to turbulence control in the valve housing 38 when a liquid fuel F enters the valve housing 38 to prevent liquid fuel carryover from the FLVV assembly 10.

The FLVV assembly 10 is shown in additional detail in FIG. 2. The cover assembly 12 as briefly introduced is connected to the fuel tank T by the mounting portion 24. The cover assembly 12 further defines a nozzle 18, a chamber 20, and a projection 22. The nozzle 18 includes an inlet 18a, a passageway 18b, and an outlet 18c in communication with the inlet 18a via the passageway 18b. The nozzle 18 is connected to an external device such as a fuel vapor recovery device (not shown) via a hose H or the like for conducting fuel vapor from the interior I of the fuel tank T to the fuel vapor recovery device. Further description and operation of the nozzle 18 and the fuel vapor recovery device are not necessary for one skilled in the art to appreciate or practice this aspect of the present invention.

FIG. 2 shows the connector 14 with an ascending annular projection 28, an ascending helical projection 30, and o-rings 32a and 32b. The projection 22 of the cover assembly 12 engages the projections 28,30 with the o-rings 32a,b inserted therebetween to provide a fuel-fuel vapor seal between the cover assembly 12 and the connector 14.

Suitable components for use as the cover assembly 12 and the connector 14 and methods for connecting them are described in U.S. patent application Ser. No. 10/651,077, filed Aug. 27, 2003. However, it will be appreciated that other suitable components can be used to connect the FLVV assembly 10, and the present invention is not limited to the foregoing example.

FIG. 2 also shows an aperture 36 defined in the connector 14, which opens into the chamber 20 of the cover assembly 12 to permit fuel vapor to vent to the fuel vapor recovery device. The connector 14 further includes a carrier guide 34 that guides a seal carrier 52 of the valve assembly 16. In this example, the valve assembly 16 includes a reopening assembly 40 that includes the float valve 42 and the seal carrier 52. The float valve 42 includes a spring 44, a float guide 46, a pivot point 48, and a first seal 50. The seal carrier 52 includes a second seal 54 defining a first opening 54a and a second opening 54b. The float valve 42 is axially movable in the seal carrier 52, which in turn is movable in the carrier guide 34 such that the first and second seals 50,54 releasably seal the aperture 36 of the connector 14 and thus, the FLVV assembly 10. Suitable components for use as the reopening assembly 40 can be found in U.S. patent application Ser. No. 10/727,716, filed Dec. 4, 2003. It will be appreciated that any suitable reopening valve can be used for the float valve 42, and the present invention is not limited to the foregoing example.

With reference to FIG. 3, one or more of the ribs 38c are formed to depend from the base 38d of the valve housing 38. Alternatively, the ribs 38c can be formed from the float valve 42, or alternate from both the base 38d and the float valve 42. As dictated by manufacturing requirements, these ribs 38c can also be molded in various shapes and sizes to prevent the float valve 42 from corking the holes 38h.

FIG. 3 further shows the holes 38h in the base 38d of the valve housing 38 introduced above in FIG. 1. The holes 38h permit drainage of the liquid fuel F that enters the float chamber 38b during fuel filling. By permitting the liquid fuel to drain, movement by the float valve 42 in and by the liquid fuel F during vehicle maneuvers is reduced, thus preventing liquid fuel carryover into the nozzle 18 at high liquid fuel levels.

FIG. 3 also shows the conduit system 74 of the fill control system 56 introduced in FIG. 1 above. The conduit system 74 defines first or outer conduits (passageways) 76a and 76b and second or inner conduits (passageways) 80a and 80b. The first conduits 76a,b and the second conduits 80a,b respectively terminate in large vents (apertures) 78a,b for liquid entry and vent holes (apertures) 82a,b for vapor venting. These elements dictate fuel filling conditions and control turbulence in the float chamber 38b according to various fuel conditions described below.

Those skilled in the art will appreciate that although the fill control system 56 is formed complementary with the valve housing 38 in this example, the fill control system 56 can be spaced apart from the valve housing 38. Furthermore, the first and second conduits 76a,b and 80a,b need not be formed arcuately nor adjacent each other in the fill control system 56. For example, the first conduits 76a,b can be placed on an opposite side of the valve housing 38 from the second conduits 80a,b. However, the example shown simplifies manufacturing requirements and permits suitable positioning of the FLVV 10 in the tank T. Specifically, by installing the FLVV assembly 10 in the fuel tank T with the elements of the fill control system 56 directed toward the wall W of the tank T, "clogging" of the inner conduits 80a,b caused by fuel in the fuel tank T splashing against the FLVV assembly 10 is minimized.

The above and other aspects of the invention may be better understood with reference to an exemplary operation as shown in FIGS. 4–6.

Figures 4A, 4B:
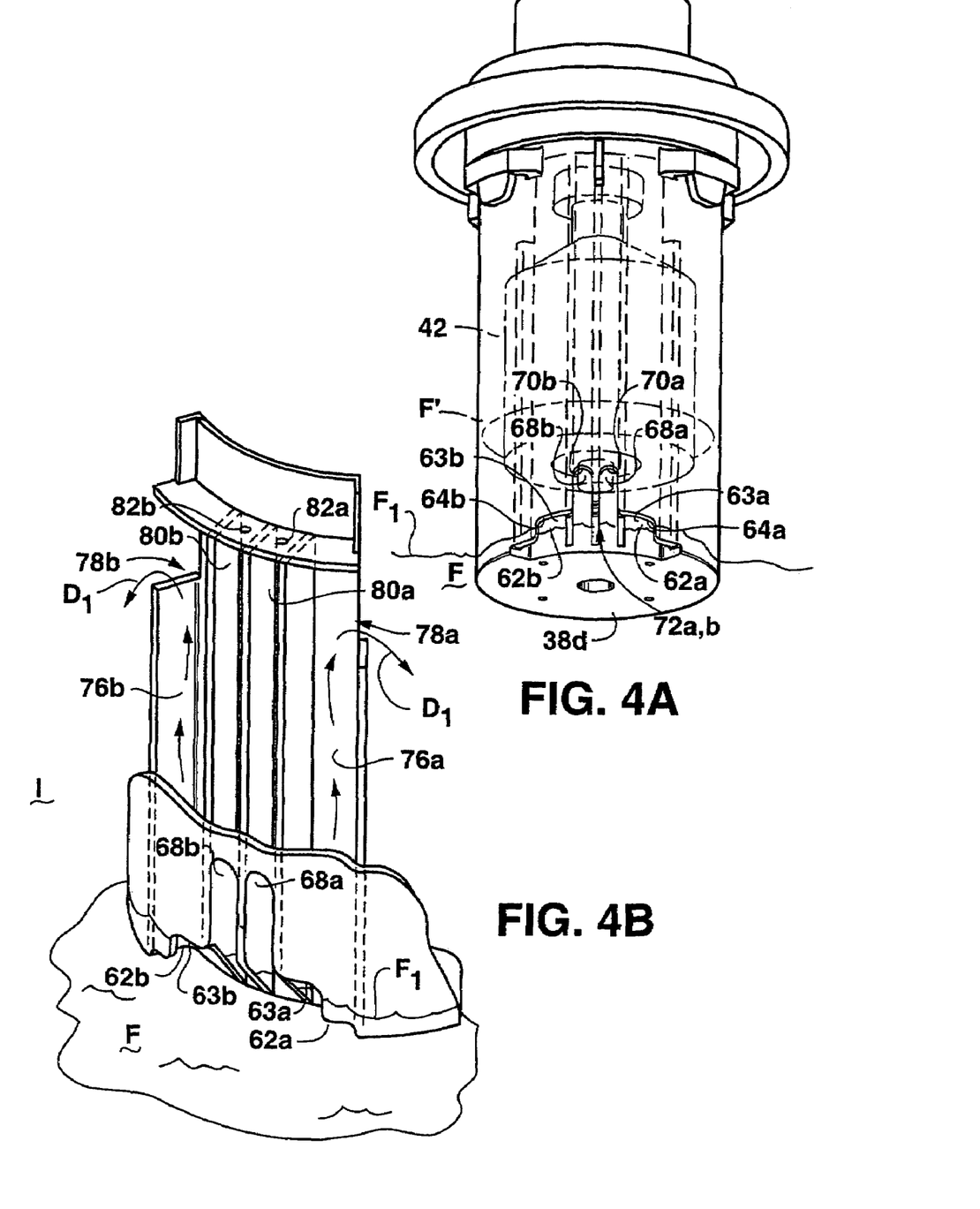
FIGS. 4a and 4b are respectively perspective and partial views of the fill limit vent valve as in FIG. 1, particularly showing liquid fuel entering the valve and causing initial fuel filling shut-off.

FIG. 4a shows a first fuel condition in which a liquid fuel level $F_1$ has reached or is near the upper edges 64a,b of the main vent windows 62a and 62b. It will be understood that sizes of the first conduits 76a,b and manufacturing tolerances can trigger the first fuel condition within +/−1 mm of the upper edges 64a,b. Therefore, with the upper edges 64a,b substantially obstructed by the liquid fuel level $F_1$, the main vent windows 62a and 62b are effectively closed to cause pressure in the interior I of the tank T to increase.

FIG. 4b specifically shows the increased tank pressure forcing the liquid fuel F into the first conduits 76a,b and into the float chamber 38b via the entry apertures 78a,b. Directional arrows $D_1$ indicate this phenomenon. As shown in this aspect of the invention, the entry apertures 78a,b are directed parallel with or toward the inner wall 38i and away from the nozzle inlet 18a and the float valve 42 (compare FIG. 3). Accordingly, the liquid fuel F is not as likely to splash, create turbulence and disturb the float valve 42 when entering the float chamber 38b. By minimizing turbulence in the float chamber 38b, liquid fuel carryover into the nozzle inlet 18a is prevented.

With further reference to FIGS. 2 and 4a,b, when sufficient liquid fuel F' has entered the float chamber 38b, the float valve 42 is buoyed to seal the aperture 36 temporarily in the first fuel condition. Accordingly, pressure in the float chamber 38b increases preventing additional liquid fuel F from entering the first conduits 76a,b. Pressure in the fuel tank T thus increases to cause a pressure sensor on a fill nozzle (not shown) to shut-off fuel filling from a fuel pump (not shown).

Also shown in FIGS. 4a,b, the upper edges 64a,b are angled relative to the base 38d to create an infinite series of decreasing cross sectional openings 63a,b in an axial direction from about the upper edges 64a,b opening into respective first conduits 76a,b. In other words, as the liquid fuel level $F_1$ rises towards the angled upper edges 64a/b, the openings 63a,b decrease in gradations in a direction of the cover assembly 12 like a virtual funnel opening. Therefore, a pressure in the fuel tank interior I gradually increases. Such a gradually increasing pressure differential between the fuel tank interior I and the float chamber 38b propels the liquid fuel F into the first conduits 76a,b in a controlled manner indicated by the arrows $D_1$ rather than as turbulent geysers.

In another aspect of the invention similar to the example in FIGS. 4a,b, the upper edges 64a,b can be formed horizontally or essentially parallel to the base 38d of the valve housing 38. According to this alternative, a "single" opening is formed from about respective upper edges 64a,b leading into the first conduits 76a,b. Thus, when the liquid fuel level $F_1$ reaches the upper edges 64a,b, the cross sections of the openings 63a,b become zero immediately rather than gradually decreasing. Pressure will increase more rapidly in the tank interior I and cause faster entry of the liquid fuel F into the first conduits 76a/b. A resulting geyser effect as noted above may occur that creates turbulence in the float chamber 38b and results in some liquid fuel carryover to the fuel vapor recovery device.

Those skilled in the art will appreciate that the shape and orientation of the openings 63a,b as well as the first conduits 76a,b can be any shape such as circular, square, octagonal, rectangular or the like while respectively decreasing circumferentially as the liquid fuel F rises. Similarly, the main vent windows 62a,b and respective upper edges 64a,b are not limited to the examples shown in the Figures. For instance, the upper edges 64a,b can be angled slightly upward in a direction away from the fill slots 68a/b and achieve the gradually decreasing cross sections described above.

Also shown in this aspect of the invention, the first conduits 76a,b and the second conduits 80a,b extend respective first and second distances along the housing 38 and terminate in the respective first and second vent apertures 78a,b and 82a,b. The second vent apertures 82a,b are located above the first vent apertures 78a,b to prevent "clogging" the inner conduits 80a,b with the liquid fuel F such that the FLVV assembly 10 vents according to the interim fuel condition described below. Also shown in FIGS. 4a,b and described below, the first vent apertures 82a,b are sized to allow fuel vapor to escape into the interior I at a set rate.

Figure 5A:
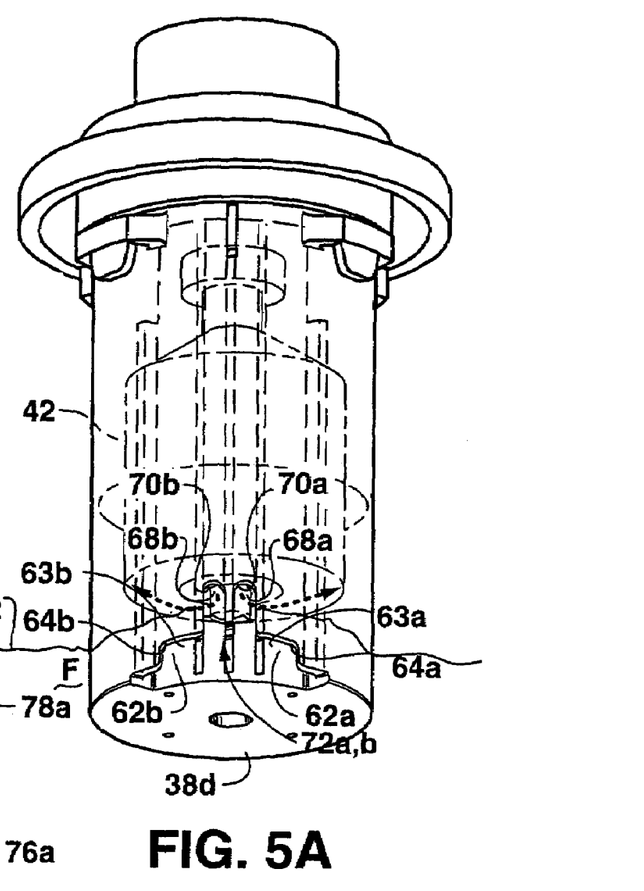
FIGS. 5a and 5b are respectively similar to FIGS. 4a and 4b, particularly showing fuel vapor venting from the valve.
Figure 5B:
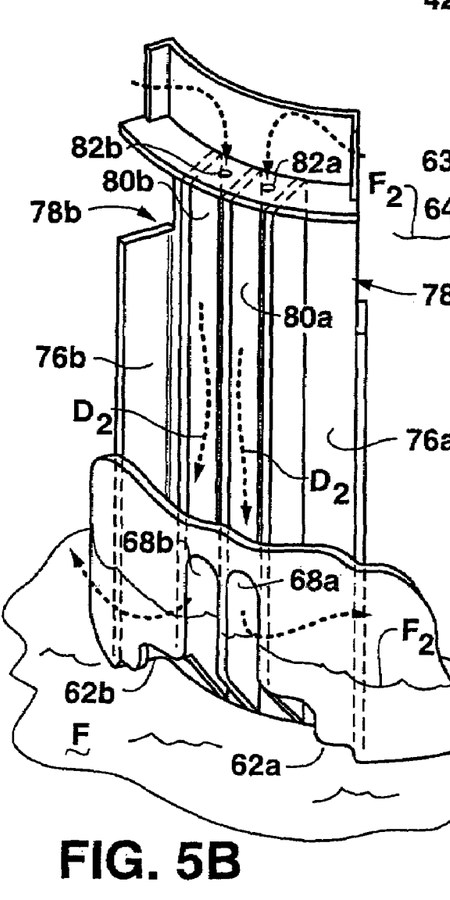

FIGS. 5a and 5b show the interim fuel condition in which a liquid fuel level $F_2$ has reached a point at or above the upper edges 64a,b, but the liquid fuel F has not yet obstructed the top edges 70a,b of the fill slots 68a,b. In this interim fuel condition, fuel vapor continues to vent from the float chamber 38b through the vent holes 82a,b as indicated by the directional arrows $D_2$. Accordingly, higher pressure in the float chamber 38b equalizes with lower pressure in the fuel tank T. Once the pressure differential between the float chamber 38b and the fuel tank T is equalized, the first seal 50 (see FIG. 2) releases followed by the second seal 54 under the weight of the float valve 42 as described, for example, in U.S. patent application Ser. No. 10/727,716. Once the float valve 42 unseals from about the aperture 36, the operator is able to "trickle fill" a predetermined amount of additional fuel in this interim fuel condition.

A total amount of additional fuel that the operator is able to pump into the tank T during the interim fuel condition occurs in spaced apart "trickle fills". The total amount is a function of a height of the secondary fill slots 68a,b measured between the top edges 70a,b and the bottom edges 72a,b. A period of time between each "trickle fill" or shut-off "click" of the fill nozzle is determined by an orifice size of the second vent apertures 82a,b. In this example, the orifice size of each of the second vent apertures 82a,b is about 2 millimeters (mm) and a total additional five (5) liters of fuel after the initial shut-off is required in the first fuel condition. Thus, each trickle fill will supply 0.5 liters of fuel for a total of ten (10) clicks with three (3) to five (5) seconds between clicks. Accordingly, the trickle fill activity will last approximately 30–50 seconds. As noted, the second vent apertures 82a,b are placed above the large vent apertures 78a,b to prevent liquid fuel F from entering the inner conduits 80a,b (see also FIG. 3). Otherwise, liquid fuel F in the inner conduits 80a,b would have to drain before pressure equalization could occur, which would slow equalization from the desired 3–5 seconds.

Those skilled in the art will recognize that the orifice sizes of the second vent apertures 82a,b can be modified to decrease or increase the period of time between clicks. For instance, 2.5–3 mm-sized second vent apertures will permit pressure equalization sooner than the 2.0 mm-sized apertures 82a,b.

Figure 6A:
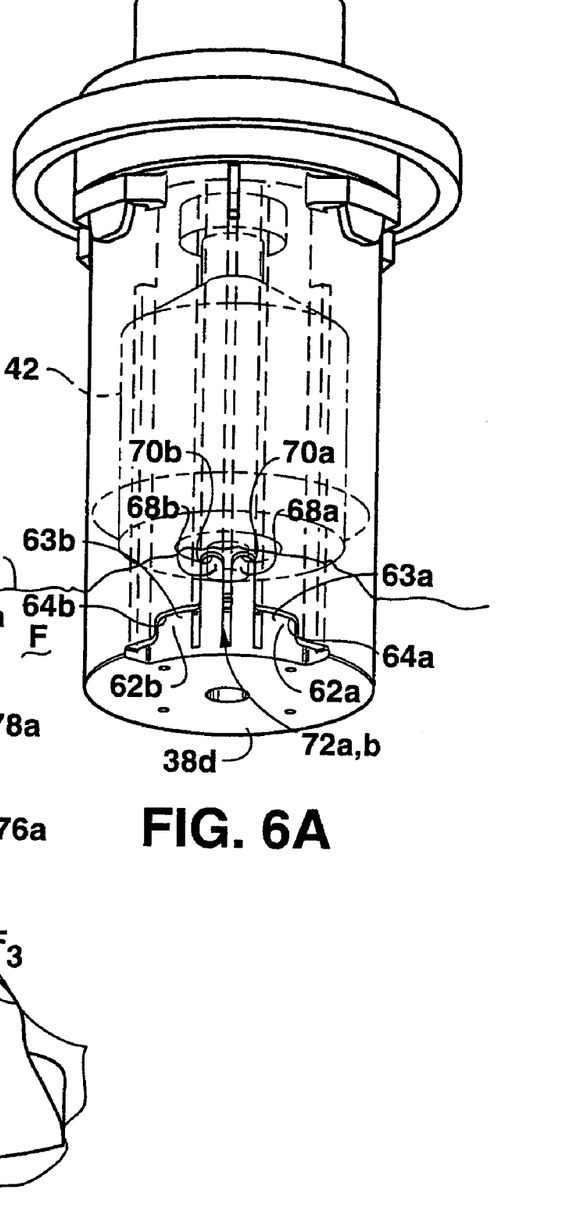
FIGS. 6a and 6b are respectively similar to FIGS. 5a and 5b, particularly showing liquid fuel blocking fuel vapor venting from the valve.
Figure 6B:
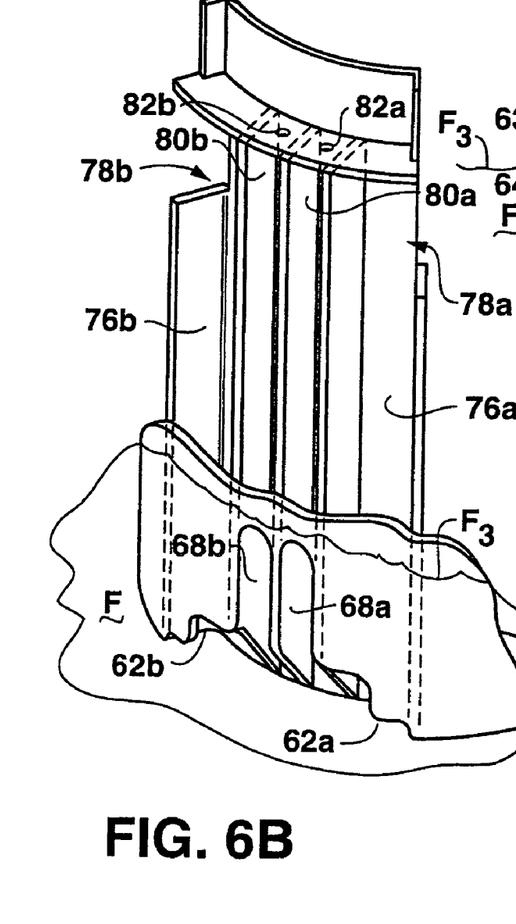

FIGS. 6a and 6b show a second fuel condition in which a liquid fuel level $F_3$ has reached at least the top edges 70a,b such that the liquid fuel F obstructs the fill slots 68a,b. In this second fuel condition, fuel vapor cannot vent from the float chamber 38b via the vent holes 82a,b and upper ends of the fill slots 68a,b. Thus, pressure in the float chamber 38b cannot equalize with pressure in the interior I of the fuel tank T, and the float valve 42 cannot unseal from about the aperture 36, e.g., in 3–5 seconds. Therefore, the operator is unable to continue trickle filling and is unable to overfill the fuel tank T. Those skilled in the art will recognize that the height of the fill slots 68a,b can be adjusted higher or lower to increase or decrease, respectively, the total amount of additional, trickle-filled fuel F.

With further reference to FIGS. 3 and 6a,b, the pinhole 38e will permit subsequent venting from the float chamber 38b following the second fuel condition to equalize the pressure differential with the tank interior I. The pinhole 38e is sized appropriately such that this ensuing equalization will take longer than the typical operator will wait for the float valve 42 to unseal from about the aperture 36 after final fuel shut-off. For example, the pinhole 38e is about 0.5 mm to provide a relatively low venting rate to delay opening the FLVV assembly 10 after the tank T is fuel. The pinhole 38e can be sized differently to change the venting rate, but any delay it provides will serve to prevent overfilling from excess trickle filling.

The main vent windows 62a,b and respective openings 63a,b and upper edges 64a,b have been described with respect to preventing dynamic turbulence in the float chamber 38b to prevent unwanted liquid fuel carryover from the FLVV assembly 10 during fuel filling. In another aspect of the invention, the FLVV assembly 10 prevents fuel carryover under static conditions. Specifically, the first vent apertures 78a,b of the fill control system 56 are arranged to prevent turbulence in a stationary, usually hot environment, which can create a "washing machine" effect in a conventional valve.

The conventional valve is susceptible to the washing machine effect under hot, static conditions because a heated fuel tank expands and a fuel level in the tank falls. After the fuel level drops, a fuel entry window in the valve opens sufficiently to permit injection of a pressurized air/fuel mixture from the fuel tank into the valve. The pressurized air/fuel mixture can create turbulence in any fuel within the valve and adversely affect the sealing capability of the valve. If the valve is not properly sealed, liquid fuel can carry over to the fuel vapor recovery device.

Figure 7A:
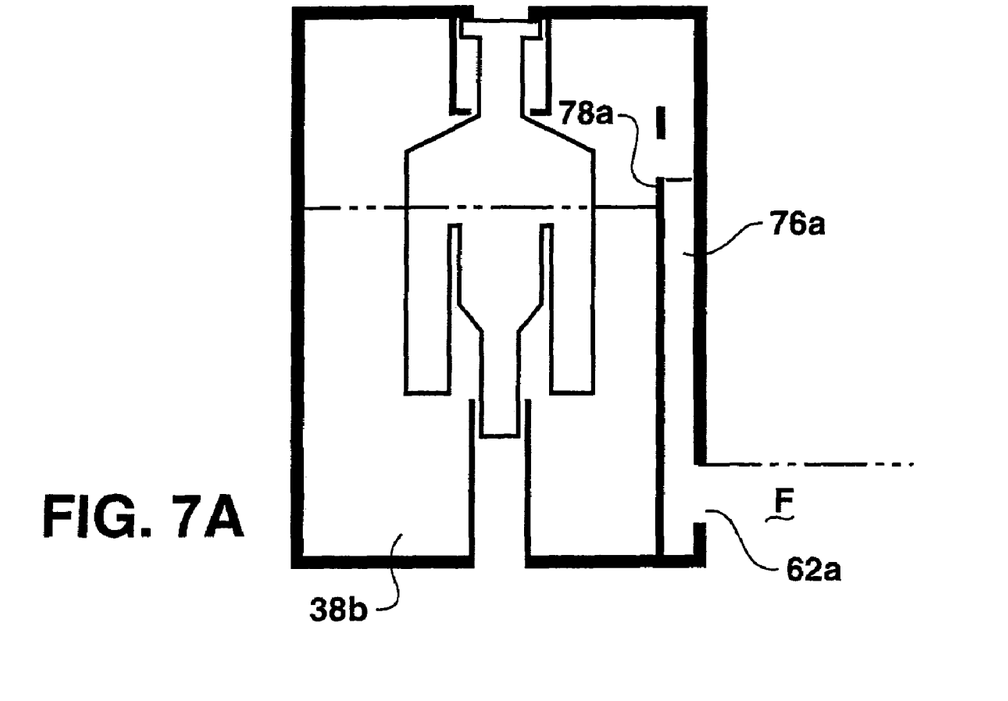
FIG. 7a is a schematic view of a fill limit vent valve according to an aspect of the present invention, particularly showing a fuel entry window immersed in liquid fuel in a full fuel tank.
Figure 7B:
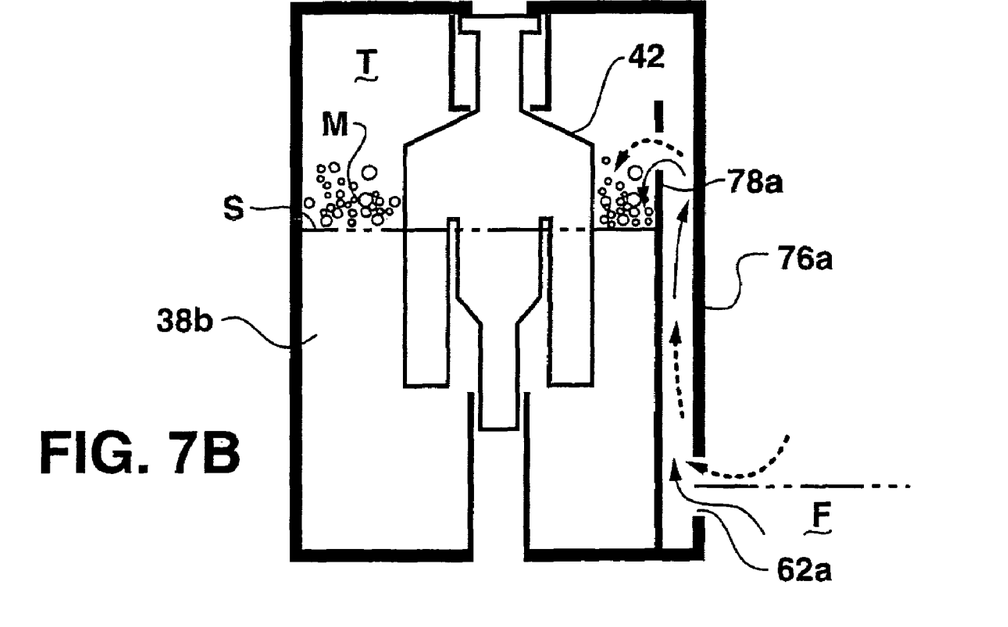
FIG. 7b is similar to FIG. 7a, particularly showing a pressurized fuel-air mixture entering an open portion of a main entry window with possible turbulence restricted to a fill control system according to an aspect of the present invention.

FIGS. 7a and 7b schematically show the FLVV assembly 10 described above. FIG. 7a shows the liquid fuel F in both the float chamber 38b and the first conduits 76a,b when the tank T is full. In contrast to the typical valve, FIG. 7b shows that the FLVV assembly 10 is resistant to the washing machine effect. Specifically, the first vent apertures 78a,b are formed above a maximum height of the fuel F in the float chamber 38b; i.e., above a maximum buoyancy level of the float valve 42. As temperature increases, the tank T expands and the level of fuel F in the tank F drops sufficiently to open a portion of the main vent windows 62a,b. However, the pressurized air from the interior I of the tank T is confined in the first conduits 76a,b rather than injected directly into the fuel F as in FIG. 7b. Thus, the pressurized air and any liquid fuel mix M is constrained near or on a top surface S of the fuel F in the float chamber 38b. The float valve 42 is relatively undisturbed by the mix M and remains seated and sealed against the aperture 36. Accordingly, no fuel carry-over occurs from the FLVV assembly 10 in this static condition. Thus, overpressure venting is appropriately accomplished, for instance, via a separate venting device (not shown) in an Onboard Refueling Vapor Recovery (ORVR) vehicle fuel system to the fuel vapor recovery device.

In contrast to the present invention, FIGS. 8a and 8b show the typical valve V, which is subject to the washing machine effect. As discussed above, FIG. 8a shows the fuel entry window X defined in the housing Y of the valve V through which liquid fuel enters when the fuel tank is full. FIG. 8b shows the washing machine phenomenon in a stationary vehicle on a hot day. The liquid fuel in the conventional valve V is churned up by turbulence as noted above. This churning causes the conventional valve V to improperly seal, which permits some liquid fuel to escape to the fuel vapor recovery device or to atmosphere as indicated by arrow $D_4$.

While preferred embodiments of the invention have been shown and described, those skilled in the art will recognize that other changes and modifications may be made to the foregoing examples without departing from the scope and spirit of the invention. For instance, numerical ranges are set forth for current applications and industry regulations, but these ranges may be altered to suit particular applications. It is intended to claim all such changes and modifications as fall within the scope of the appended claims and their equivalents. Moreover, references herein to "top," "upward," "upper," "higher," "lower," "bottom," "downward," "descending," "ascending," "side," "first," and "second" structures, elements, designations, geometries and the like are intended solely for purposes of providing an enabling disclosure and in no way suggest limitations regarding the operative orientation or order of the exemplary embodiments or any components thereof.

That which is claimed is:

1. A fill limit vent valve assembly configured for attachment to a fuel tank wall and having a cover assembly with a nozzle configured for connection to a vapor recovery device for a fuel tank, the fill limit vent valve assembly comprising:
   a valve assembly having a housing connectable to the cover assembly in vapor communication with the nozzle; and
   a fill control system defining at least one window in communication with at least one conduit disposed proximate the housing, the conduit terminating in a vent aperture in the housing, the window and the vent aperture configured for directing a liquid fuel into the housing to limit turbulence therein to prevent liquid fuel carry-over to the vapor recovery device.

2. The fill limit vent valve assembly as in claim 1, wherein the window defines an upper edge configured to shut-off fuel filling in a first fuel condition when the rising liquid fuel reaches proximate the upper edge.

3. The fill limit vent valve assembly as in claim 2, wherein the upper edge diverges from horizontal such that the rising liquid fuel closes the window in gradations to gradually build up pressure in the fuel tank to cause the liquid fuel to rise in the conduit and enter the housing in a controlled manner.

4. The fill limit vent valve assembly as in claim 2, further comprising a secondary fuel control window defining a top edge configured to shut-off fuel filling in a second fuel condition when the rising liquid fuel reaches proximate the top edge.

5. The fill limit vent valve assembly as in claim 4, wherein the second fuel condition results when the liquid fuel obstructs the top edge of the secondary fuel control window such that fuel vapor venting from the housing via the secondary fuel control window is at least temporarily blocked to cause vapor pressure in the fuel tank to back up the liquid fuel in a fill nozzle and trigger a fill-limit sensor to at least temporarily stop fuel filling.

6. The fill limit vent valve assembly as in claim 5, further comprising a pinhole in the housing defined above a maximum fluid level in the housing, the pinhole configured to equalize a differential pressure between the housing and the fuel tank after the second fuel condition to permit a float valve of the valve assembly to move in an axial direction away from the vapor-inlet opening.

7. The fill limit vent valve assembly as in claim 1, wherein the at least one window is a primary fuel control window and further comprising a secondary fill slot spaced apart from the primary fuel control window, the primary fuel control window and the secondary fill slot configured to control an initial fuel filling condition, an interim fuel filling condition, and a final fuel filling shut-off condition.

8. A fill limit vent valve assembly at least partially disposed within an interior of a fuel tank and configured for connection to a vapor recovery device, the fill limit vent valve assembly comprising:
   a cover assembly having a nozzle and a mounting portion, the nozzle in communication with the vapor recovery device and defining a vapor-inlet opening, a vapor-outlet opening and a passageway therebetween, the mounting portion configured for attachment to a fuel tank wall; and
   a valve assembly attachable to the cover assembly in vapor communication with the nozzle, the valve assembly including a housing, a float valve, and a fill control system, the housing defining a base and a float chamber therein, the float valve operably disposed within the float chamber and cooperable with the fill control system to seal the vapor-inlet opening of the nozzle,
   wherein the fill control system defines a primary fuel control window, a secondary fuel control window, a first conduit and a second conduit, the primary and secondary fuel control windows in respective communication with the first and second conduits, the first conduit extending a first distance along the housing and terminating in a first vent aperture, the second conduit extending a second distance along the housing and terminating in a second vent aperture spaced apart from the first vent aperture, the primary fuel control window and the first vent aperture configured to facilitate fuel filling shut-off in a first fuel condition, the secondary fuel control window configured to shut-off fuel filling in a second fuel condition, the second vent aperture configured to provide a fixed amount of fuel vapor venting from the float chamber between the first and second fuel conditions to control entry of a set quantity of a liquid fuel into the fuel tank after the first fuel condition and before the second fuel condition.

9. The fill limit vent valve assembly as in claim 8, wherein the base is configured to direct the liquid fuel when rising in the fuel tank into the primary fuel control window.

10. The fill limit vent valve assembly as in claim 8, wherein the base defines a hole therethrough, the hole configured for liquid fuel drainage from the float chamber.

11. The fill limit vent valve assembly as in claim 8, wherein the primary fuel control window defines an upper edge configured to shut-off fuel filling in the first fuel condition when the rising liquid fuel reaches proximate the upper edge.

12. The fill limit vent valve assembly as in claim 11, wherein the first fuel condition occurs when the liquid fuel rises proximate the upper edge and vapor pressure in the fuel tank causes the liquid fuel to enter the first conduit and enter the float chamber via the first vent aperture such that the float valve is buoyed by the liquid fuel in the float chamber to seal the vapor-inlet opening.

13. The fill limit vent valve assembly as in claim 12, wherein the upper edge diverges from horizontal such that the rising liquid fuel closes the primary fuel control window in gradations to gradually build up pressure in the fuel tank to cause the liquid fuel to rise in the first conduit and enter the float chamber in a controlled manner.

14. The fill limit vent valve assembly as in claim 11, wherein the upper edge diverges relative to the base such that a cross-section of the rising liquid fuel is sized to control a flow rate of the liquid fuel into the first conduit.

15. The fill limit vent valve assembly as in claim 8, wherein the secondary fuel control window defines a top edge configured to shut-off fuel filling in the second fuel condition when the rising liquid fuel reaches proximate the top edge.

16. The fill limit vent valve assembly as in claim 15, wherein the second fuel condition results when the liquid fuel obstructs the top edge of the secondary fuel control window such that fuel vapor venting from the float chamber via the second conduit and the second vent aperture is at least temporarily blocked to cause vapor pressure in the fuel tank to back up the liquid fuel in a fill nozzle and trigger a fill-limit sensor to at least temporarily stop fuel filling.

17. The fill limit vent valve assembly as in claim 8, wherein the first and second conduits are configured to communicate a liquid, a vapor, and combinations thereof to one of the float chamber or to the interior of the fuel tank.

18. The fill limit vent valve assembly as in claim 8, wherein the fill control system is disposed in a direction of the fuel tank wall to reduce exposure to liquid fuel splash in the fuel tank.

19. The fill limit vent valve assembly as in claim 8, wherein the first conduit defines at least two passageways in communication with the float chamber.

20. The fill limit vent valve assembly as in claim 19, wherein the at least two passageways are in liquid communication with the float chamber.

21. The fill limit vent valve assembly as in claim 8, wherein the second conduit defines at least two passageways in communication with the float chamber.

22. The fill limit vent valve assembly as in claim 21, wherein the at least two passageways are in vapor communication with the float chamber.

23. The fill limit vent valve assembly as in claim 8, wherein the first vent aperture is configured to deliver the liquid fuel from the first conduit into the float chamber.

24. The fill limit vent valve assembly as in claim 23, wherein the first vent aperture opens proximate an inner wall of the float chamber such that entry of the liquid fuel from the first conduit into the float chamber is directed away from the vapor-inlet opening and the float valve to reduce turbulence in the housing.

25. The fill limit vent valve assembly as in claim 8, wherein the second distance is greater than the first distance such that the second vent aperture is spaced closer to the vapor-inlet opening than the first vent aperture.

26. The fill limit vent valve assembly as in claim 8, wherein the second vent aperture is arranged at least above a maximum fluid level in the float chamber to control the liquid fuel from entering the second vent aperture.

27. The fill limit vent valve assembly as in claim 26, wherein the maximum fluid level in the float chamber is defined by a maximum axial movement of the float valve in a direction of the vapor-inlet opening.

28. The fill limit vent valve assembly as in claim 8, wherein the first vent aperture is arranged above a maximum fuel level in the float chamber to prevent turbulence from unsealing the float valve in a static condition.

29. The fill limit vent valve assembly as in claim 28, wherein a temperature increase in the static condition causes the fuel tank to expand and allows the liquid fuel to rise into the first conduit.

30. The fill limit vent valve assembly as in claim 29, wherein the vapor-inlet opening remains sealed by the float valve such that a pressure relief valve is operable to relieve pressure in the fuel tank to prevent liquid fuel carry-over to the vapor recovery device.

31. The fill limit vent valve assembly as in claim 8, wherein a rate of pressure equalization between the float chamber and the fuel tank after the first fuel condition is a function of a diameter of the second vent aperture.

32. The fill limit vent valve assembly as in claim 31, wherein a period of time between at least two trickle fills is a function of the diameter of the second vent aperture.

33. The fill limit vent valve assembly as in claim 31, wherein the diameter of the second vent aperture is from about 2.0 mm to about 3.0 mm.

34. The fill limit vent valve assembly as in claim 8, further comprising a pinhole in the housing defined above a maximum fluid level in the float chamber, the pinhole configured to equalize a differential pressure in the float chamber with a pressure in the fuel tank after the second fuel condition to permit the float valve to move in an axial direction away from the vapor-inlet opening.

35. The fill limit vent valve assembly as in claim 8, wherein the float valve is configured to releasably seal the vapor-inlet opening of the nozzle during one of the first fuel condition, the second fuel condition, or intermittently therebetween.

36. A fill limit vent valve assembly at least partly disposed in an interior of a fuel tank, the fill limit vent valve assembly comprising:
    a cover assembly having a nozzle and a mounting portion, the nozzle defining a vapor-inlet opening, a vapor-outlet opening and a passageway therebetween, the nozzle configured for connection to a vapor recovery device, the mounting portion configured for attachment to a fuel tank wall; and
    a valve assembly connectable to the cover assembly in vapor communication with the nozzle, the valve assembly including a housing, a float valve, and a fill control system, the housing defining a base and a float chamber therein, the base configured to direct a rising liquid fuel from the fuel tank into the primary fuel control window, the float valve operably disposed within the float chamber and cooperable with the fill control system to seal the vapor-inlet opening of the nozzle, the fill control system defining a primary fuel control window, a secondary fuel control window, a first conduit and a second conduit, the primary and secondary fuel control windows in respective communication with the first and second conduits, the first conduit extending a first distance along the housing and terminating in a first vent aperture opening proximate an inner wall of the float chamber, the second conduit extending a second distance along the housing and terminating in a second vent aperture spaced apart from the first vent aperture, the primary fuel control window and the first vent aperture configured to control entry of the liquid fuel from the first conduit into the float chamber to reduce turbulence in the housing and to shut-off fuel filling in a first fuel condition, the secondary fuel control window configured to shut-off fuel filling in a second fuel condition, the second vent aperture configured to provide a fixed amount of fuel vapor venting from the float chamber between the first and second fuel conditions to control entry into the fuel tank of a set quantity of the liquid fuel after the first fuel condition and prior to the second fuel condition.

37. The fill limit vent valve assembly as in claim 36, wherein the base defines a hole therethrough, the hole configured for liquid fuel drainage from the float chamber.

38. The fill limit vent valve assembly as in claim 36, wherein the primary fuel control window defines an upper edge configured to shut-off fuel filling in the first fuel condition when the rising liquid fuel reaches proximate the upper edge.

39. The fill limit vent valve assembly as in claim 38, wherein the first fuel condition occurs when the liquid fuel rises proximate the upper edge and vapor pressure in the fuel tank causes the liquid fuel to enter the first conduit and enter the float chamber via the first vent aperture such that the float valve is buoyed by the liquid fuel in the float chamber to seal the vapor-inlet opening.

40. The fill limit vent valve assembly as in claim 39, wherein the upper edge diverges from horizontal such that the rising liquid fuel closes the primary fuel control window in gradations to gradually build up pressure in the fuel tank to cause the liquid fuel to rise in the first conduit and enter the float chamber in a controlled manner.

41. The fill limit vent valve assembly as in claim 39, wherein the upper edge diverges relative to the base such that a cross-section of the rising liquid fuel is sized to control a flow rate of the liquid fuel into the first conduit.

42. The fill limit vent valve assembly as in claim 36, wherein the secondary fuel control window defines a top edge configured to shut-off fuel filling in the second fuel condition when the rising liquid fuel reaches proximate the top edge.

43. The fill limit vent valve assembly as in claim 42, wherein the second fuel condition results when the liquid fuel obstructs the top edge of the secondary fuel control window such that fuel vapor venting from the float chamber via the second conduit and the second vent aperture is at least temporarily blocked to cause vapor pressure in the fuel tank to back up the liquid fuel in a fill nozzle and trigger a fill-limit sensor to at least temporarily stop fuel filling.

44. The fill limit vent valve assembly as in claim 36, wherein the first and second conduits are configured to communicate a liquid, a vapor, and combinations thereof to one of the float chamber or to the interior of the fuel tank.

45. The fill limit vent valve assembly as in claim 36, wherein the first conduit defines at least two passageways in communication with the float chamber.

46. The fill limit vent valve assembly as in claim 45, wherein the at least two passageways are in liquid communication with the float chamber.

47. The fill limit vent valve assembly as in claim 36, wherein the second conduit defines at least two passageways in communication with the float chamber.

48. The fill limit vent valve assembly as in claim 47, wherein the at least two passageways are in vapor communication with the float chamber.

49. The fill limit vent valve assembly as in claim 36, wherein the first vent aperture is configured to deliver the liquid fuel from the first conduit into the float chamber.

50. The fill limit vent valve assembly as in claim 49, wherein the first vent aperture opens proximate an inner wall of the float chamber such that entry of the liquid fuel from the first conduit into the float chamber is directed away from the vapor-inlet opening and the float valve to reduce turbulence in the housing.

51. The fill limit vent valve assembly as in claim 36, wherein the second distance is greater than the first distance such that the second vent aperture is spaced closer to the vapor-inlet opening than the first vent aperture.

52. The fill limit vent valve assembly as in claim 36, wherein the first vent aperture is arranged above a maximum axial movement of the float valve in a direction of the vapor-inlet opening.

53. The fill limit vent valve assembly as in claim 38, wherein a fuel-vapor mix is contained in the first conduit and above a maximum fuel level in the float chamber such that the float valve remains sealed proximate the vapor-inlet opening in a static condition.

54. The fill limit vent valve assembly as in claim 36, wherein a rate of pressure equalization between the float chamber and the fuel tank during the first fuel condition is a function of a diameter of the second vent aperture.

55. The fill limit vent valve assembly as in claim 54, wherein a period of time between at least two trickle fills is a function of the diameter of the second vent aperture.

56. The fill limit vent valve assembly as in claim 36, further comprising a pinhole in the housing defined above a maximum fluid level in the float chamber, the pinhole configured to equalize a differential pressure in the float chamber with a pressure in the fuel tank after the second fuel condition to permit the float valve to move in an axial direction away from the vapor-inlet opening.

57. A fill limit vent valve assembly for attachment to a fuel tank wall, the fill limit vent valve assembly comprising:
a cover assembly having a nozzle defining a vapor-inlet opening, a vapor-outlet opening and a passageway therebetween; and
a valve assembly connectable to the cover assembly in vapor communication with the nozzle, the valve assembly including a housing and a float valve, the housing defining a base and a float chamber therein, the base configured to direct a rising liquid fuel from the fuel tank through the primary fuel control window; and
a fill control system defining a primary fuel control window, a secondary fuel control window, a first conduit and a second conduit, the primary and secondary fuel control windows in respective communication with the first and second conduits, the first conduit terminating in a first vent aperture opening into the float chamber, the second conduit terminating in a second vent aperture opening into the float chamber, the primary fuel control window and the first vent aperture configured to control entry of the liquid fuel from the first conduit into the float chamber to facilitate sealing of the vapor-inlet opening by the float valve in a first fuel condition, the secondary fuel control window configured to shut-off fuel filling in a second fuel condition, the second vent aperture configured to provide a fixed amount of fuel vapor venting from the float chamber to control entry of a set quantity of the liquid fuel before the second fuel condition.

58. The fill limit vent valve assembly as in claim 57, wherein the base defines a hole therethrough, the hole configured for liquid fuel drainage from the float chamber.

59. The fill limit vent valve assembly as in claim 57, wherein the primary fuel control window defines an upper edge configured to shut-off fuel filling in the first fuel condition when the rising liquid fuel reaches proximate the upper edge.

60. The fill limit vent valve assembly as in claim 59, wherein the first fuel condition occurs when the liquid fuel rises proximate the upper edge and vapor pressure in the fuel tank causes the liquid fuel to enter the first conduit and enter the float chamber via the first vent aperture such that the float valve is buoyed by the liquid fuel in the float chamber to seal the vapor-inlet opening.

61. The fill limit vent valve assembly as in claim 59, wherein the secondary fuel control window defines a top edge configured to shut-off fuel filling in the second fuel condition when the rising liquid fuel reaches proximate the top edge.

62. The fill limit vent valve assembly as in claim 61, wherein the second fuel condition results when the liquid fuel obstructs the top edge of the secondary fuel control window such that fuel vapor venting from the float chamber via the second conduit and the second vent aperture is at least temporarily blocked to cause vapor pressure in the fuel tank to back up the liquid fuel in a fill nozzle and trigger a fill-limit sensor to at least temporarily stop fuel filling.

63. The fill limit vent valve assembly as in claim 57, wherein the first conduit defines at least two passageways in liquid communication with the float chamber.

64. The fill limit vent valve assembly as in claim 57, wherein the second conduit defines at least two passageways in vapor communication with the float chamber.

65. The fill limit vent valve assembly as in claim 57, wherein the first vent aperture is configured to deliver the liquid fuel from the first conduit into the float chamber.

66. The fill limit vent valve assembly as in claim 65, wherein the first vent aperture opens proximate an inner wall of the float chamber such that entry of the liquid fuel from the first conduit into the float chamber is directed away from the vapor-inlet opening and the float valve to reduce turbulence in the housing.

67. The fill limit vent valve assembly as in claim 57, wherein a period of time between at least two trickle fills is a function of a diameter of the second vent aperture.

68. The fill limit vent valve assembly as in claim 57, further comprising a pinhole in the housing defined above a maximum fluid level in the float chamber, the pinhole configured to equalize a differential pressure between the float chamber and the fuel tank after the second fuel condition to permit the float valve to move in an axial direction away from the vapor-inlet opening.

* * * * *